No. 683,802. Patented Oct. 1, 1901.
A. ROUSSEL.
NUT LOCK.
(Application filed July 18, 1901.)
(No Model.)

Witnesses
Elmer Leavey.
R. V. Bishop.

Inventor,
Augustin Roussel,
By Davis & Davis,
Attorneys.

UNITED STATES PATENT OFFICE.

AUGUSTIN ROUSSEL, OF ARIEL, LOUISIANA.

NUT-LOCK.

SPECIFICATION forming part of Letters Patent No. 683,802, dated October 1, 1901.

Application filed July 18, 1901. Serial No. 68,772. (No model.)

*To all whom it may concern:*

Be it known that I, AUGUSTIN ROUSSEL, a citizen of the United States, residing at Ariel, in the parish of Lafourche and State of Louisiana, have invented certain new and useful Improvements in Nut-Locks, of which the following is a full, clear, and exact specification.

Figure 1:
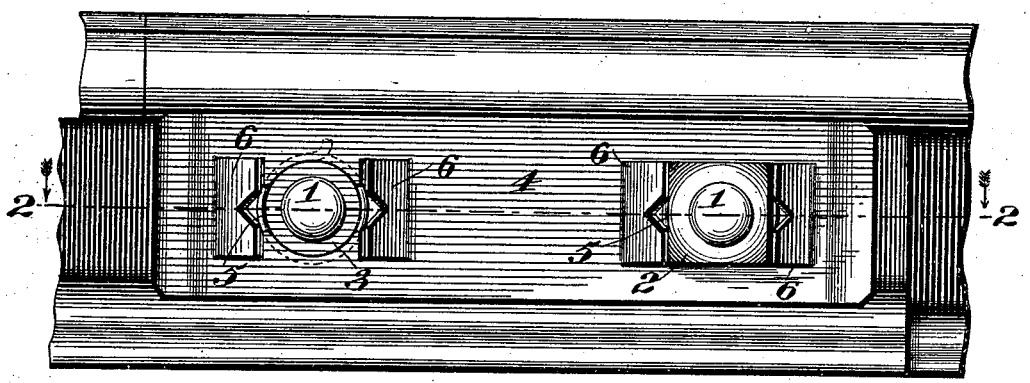
Figure 2:
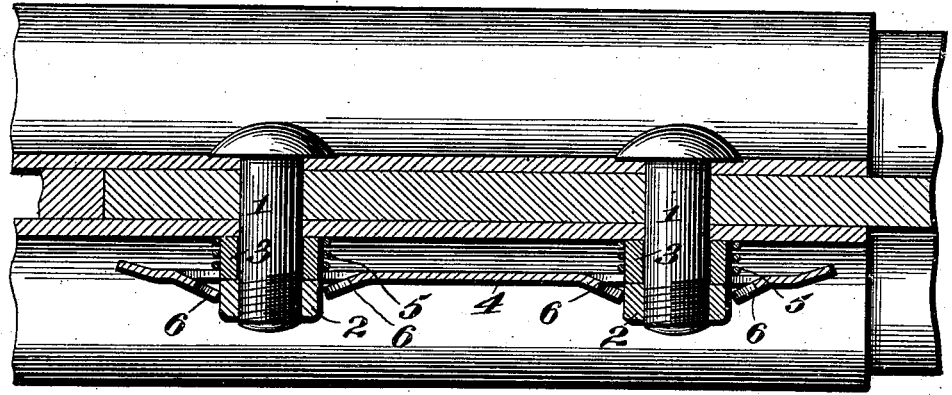
Figure 3:
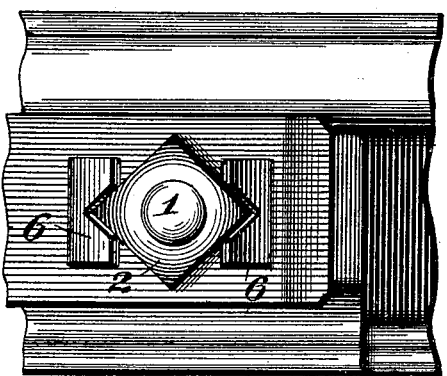

In the accompanying drawings, Figure 1 is a side elevation of a portion of a rail-joint provided with my improvements, one of the nuts being removed. Fig. 2 is a horizontal section taken on the line 2 2 of Fig. 1. Fig. 3 is a detail side elevation showing a way of engaging the nut-corners.

The object of this invention is to provide simple devices for locking nuts on their bolts, and thereby prevent accidental or premature loosening of the nuts; and it consists of certain novel features of construction and arrangement of parts, fully hereinafter described and claimed.

The bolts 1 are in the present instance supported by a railroad-rail and fish-plates of the ordinary construction; but it is evident that my device may be employed in connection with other appliances with equal advantages. Between each of the nuts 2 and the adjacent fish-plate is clamped a spacing-sleeve 3, which is cylindrical in shape and fits the bolt loosely, and is of less diameter than the nut, so that the corners of the latter will overhang or project radially beyond the cylindrical surface of the sleeve.

The lock-plate 4 is supported and confined on the two sleeves between the overhanging corners of the nuts and the adjacent fish-plate, the plate being provided with two circular openings through which the sleeves extend and which permit the lock-plate a limited sliding movement on the sleeves between the fish-plate and the projecting corners of the nut. A spiral spring 5 surrounds each sleeve and keeps the lock-plate normally pressed outward against the laterally-projecting corners of the nuts, and the lock-plate is provided with outward-extending lips or projections 6, which embrace the nuts and prevent them turning while the lock-plate is in its normal position. The lips 6 may be notched so as to engage the corners of the nuts, if desired, as shown in Fig. 3.

By pressing the lock-plate inward against the action of the springs far enough to free the lips from the nuts the latter may be tightened or removed.

Having thus described my invention, what I claim, and desire to secure by Letters Patent, is—

In combination, a support and a pair of bolts and nuts, a spacing-sleeve on each bolt between its nut and the support, said sleeve being of less diameter than the nut so that the corners of the nut will project radially beyond the sleeve, a lock-plate supported slidingly on the sleeves between the support and the projecting corners of the nuts and provided with means for engaging the nuts, and means for normally pressing said locking-plate against the nuts.

In testimony whereof I hereunto affix my signature, in the presence of two witnesses, this 15th day of July, 1901.

AUGUSTIN ROUSSEL.

Witnesses:
R. A. ROUSSEL,
ALBERT BOWDOUIN.